United States Patent
Braun et al.

(10) Patent No.: US 10,865,871 B2
(45) Date of Patent: Dec. 15, 2020

(54) ARRANGEMENT FOR AXIALLY BRACING A CVT-FIXED BEARING FROM OUTSIDE A TRANSMISSION HOUSING

(71) Applicant: Schaeffler Technologies AG & Co. KG, Herzogenaurach (DE)

(72) Inventors: Konstantin Braun, Rastatt (DE); Juri Hartmann, Hügelsheim (DE); Raphael Klima, Betschdorf (FR); Kornelius Wiegert, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/767,730

(22) PCT Filed: Nov. 21, 2016

(86) PCT No.: PCT/DE2016/200525
§ 371 (c)(1),
(2) Date: Apr. 12, 2018

(87) PCT Pub. No.: WO2017/088872
PCT Pub. Date: Jun. 1, 2017

(65) Prior Publication Data
US 2018/0306305 A1    Oct. 25, 2018

(30) Foreign Application Priority Data
Nov. 23, 2015   (DE) .......................... 10 2015 223 014

(51) Int. Cl.
*F16H 57/021*    (2012.01)
*F16C 35/067*    (2006.01)
(Continued)

(52) U.S. Cl.
CPC ......... *F16H 57/021* (2013.01); *F16C 19/546* (2013.01); *F16C 33/723* (2013.01);
(Continued)

(58) Field of Classification Search
CPC .......... F16H 55/56; F16H 9/18; F16H 57/035; F16C 35/067; F16C 19/06
(Continued)

(56) References Cited

U.S. PATENT DOCUMENTS

| | | | |
|---|---|---|---|
| 1,444,751 A | | 2/1923 | Mueller |
| 5,527,226 A | * | 6/1996 | Lamers .................. F16H 55/56 |
| | | | 474/43 |

(Continued)

FOREIGN PATENT DOCUMENTS

| | | |
|---|---|---|
| CN | 1938534 A | 3/2007 |
| CN | 102782365 A | 11/2012 |

(Continued)

OTHER PUBLICATIONS

International Search Report for PCT/DE2016/200525; 2 pgs; dated Feb. 20, 2017 by European Patent Office.

(Continued)

*Primary Examiner* — Henry Y Liu
(74) *Attorney, Agent, or Firm* — Matthew V. Evans

(57) ABSTRACT

A cone-pulley flexible transmission is disclosed that comprises a first shaft having a first cone-pulley pair and a second shaft having a second cone-pulley pair. The first and second cone-pulley pairs each have a first cone pulley movable in an axial direction and a second cone pulley stationary in the axial direction. A flexible transmission means may be arranged between the first and second cone-pulley pairs for torque transmission. The first and second shafts may be rotatably supported by a bearing. The bearing of the first shaft or the second shaft may be a fixed bearing. The fixed bearing may include an inner bearing ring arranged on an outer circumferential surface of a corre- (Continued)

sponding shaft and an outer bearing ring fastened to a transmission housing by a sleeve extending through a wall of the transmission housing.

13 Claims, 3 Drawing Sheets

(51) Int. Cl.
*F16H 57/035* (2012.01)
*F16C 33/72* (2006.01)
*F16C 33/76* (2006.01)
*F16C 19/54* (2006.01)
*F16H 57/02* (2012.01)

(52) U.S. Cl.
CPC .......... *F16C 33/768* (2013.01); *F16C 35/067* (2013.01); *F16H 57/035* (2013.01); *F16C 2326/01* (2013.01); *F16C 2361/63* (2013.01); *F16H 2057/0216* (2013.01); *F16H 2057/02047* (2013.01)

(58) Field of Classification Search
USPC ........................................ 474/8, 199
See application file for complete search history.

(56) References Cited

U.S. PATENT DOCUMENTS

| | | | | |
|---|---|---|---|---|
| 6,421,903 B2* | 7/2002 | Brown | ...................... | F16H 9/16 269/21 |
| 6,544,134 B2* | 4/2003 | Ohyama | .................. | B62M 7/12 474/144 |
| 7,001,293 B2* | 2/2006 | Lubben | .................... | F16C 25/06 384/519 |
| 7,341,533 B2* | 3/2008 | Wang | .................... | F16H 57/021 427/449 |
| 7,708,660 B2* | 5/2010 | Kuwabara | ............... | F16H 55/56 474/18 |
| 8,888,617 B2* | 11/2014 | Kadokawa | ................ | F16H 9/18 474/8 |
| 2004/0033851 A1* | 2/2004 | Lubben | ................... | F16C 25/06 474/8 |
| 2005/0233847 A1* | 10/2005 | Kuroda | ............... | F16H 63/3416 474/50 |
| 2005/0238273 A1* | 10/2005 | Kawamura | ........... | F16C 19/184 384/504 |
| 2008/0190673 A1* | 8/2008 | Sugitani | .................... | F16H 9/18 180/54.1 |
| 2013/0059684 A1* | 3/2013 | Kadokawa | ................ | F16H 9/18 474/8 |

FOREIGN PATENT DOCUMENTS

| | | |
|---|---|---|
| CN | 102893060 A | 1/2013 |
| DE | 3340857 A1 | 5/1985 |
| DE | 102008042609 A1 | 4/2010 |
| DE | 102009044919 A1 | 4/2010 |
| JP | 2007112272 A | 5/2007 |
| JP | 2008057657 A | 3/2008 |
| JP | 2009008211 A | 1/2009 |
| JP | 2009519408 A | 5/2009 |
| JP | 2009222177 A | 10/2009 |
| WO | 2011148474 A1 | 12/2011 |

OTHER PUBLICATIONS

English Translation of "Die Gestaltung von Waelzlagerungen" Publ. No. WL 00 200/3 DA, Fag Kugelfischer Georg Schaefer KGaA; Reichert, Dillingen, Germany.

* cited by examiner

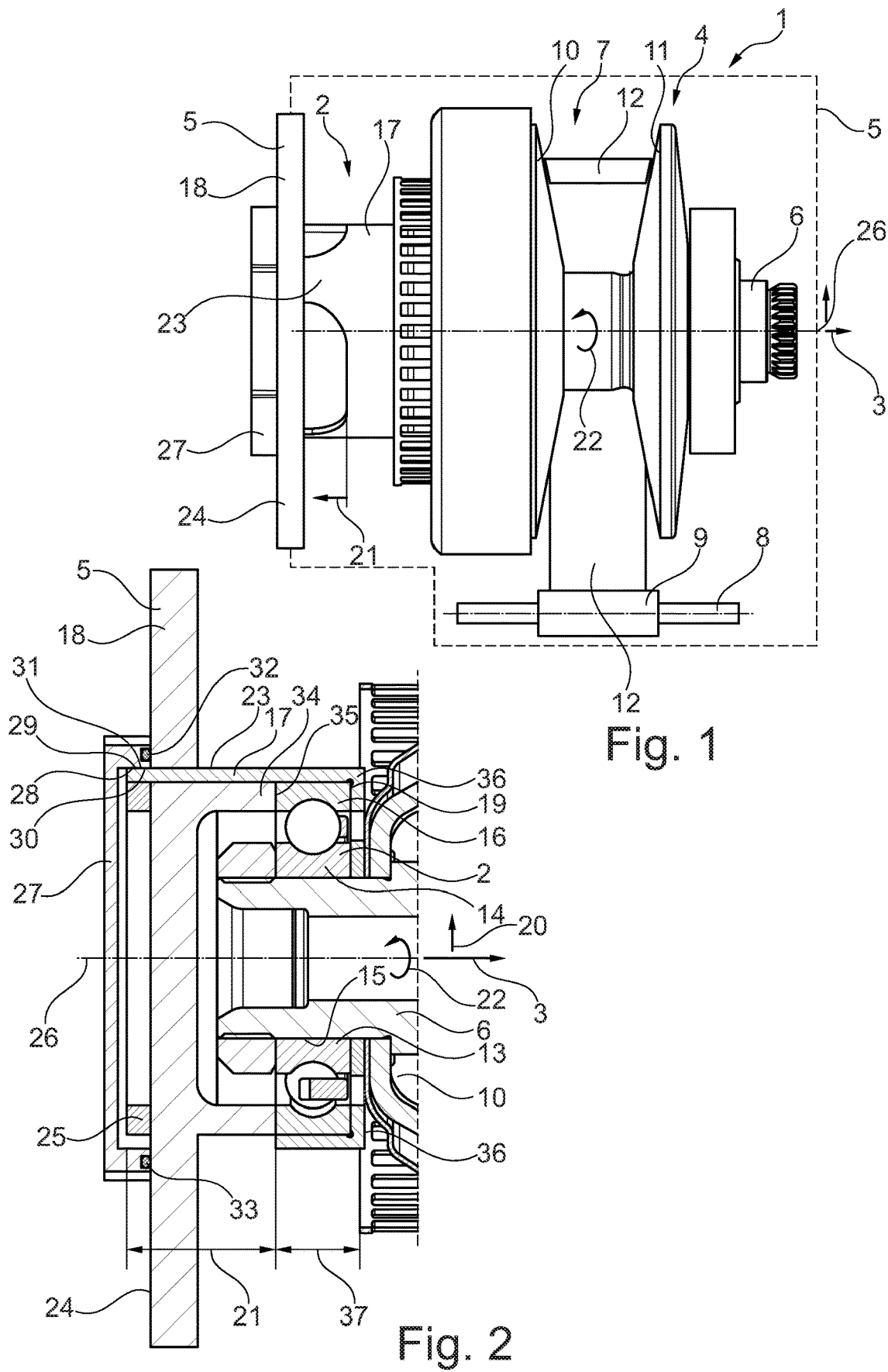

ARRANGEMENT FOR AXIALLY BRACING A CVT-FIXED BEARING FROM OUTSIDE A TRANSMISSION HOUSING

CROSS-REFERENCE TO RELATED APPLICATIONS

This application is the U.S. National Phase of PCT Appln. No. PCT/DE2016/200525 filed Nov. 21, 2016, which claims priority to DE 10 2015 223 014.7 filed Nov. 23, 2015, the entire disclosures of which are incorporated by reference herein.

TECHNICAL FIELD

The present disclosure relates to an arrangement for bracing/fixing a fixed bearing in an axial direction of a cone-pulley flexible transmission, in particular of a CVT (continuously variable transmission), preferably for a motor vehicle. In particular, the cone-pulley flexible transmission is used in conjunction with a combustion engine or some other drive unit for driving a motor vehicle.

BACKGROUND

A cone-pulley flexible transmission of this kind generally comprises at least one first cone-pulley pair and a second cone-pulley pair, each having a first cone pulley, which can be moved in an axial direction, and a second cone pulley, which is fixed in the axial direction, and a flexible transmission means arranged for torque transmission between the cone-pulley pairs. The first cone-pulley pair is arranged on a first shaft and the second cone-pulley pair is arranged on a second shaft. The shafts are each rotatably mounted by means of a rolling-element bearing relative to a transmission housing surrounding said components.

A cone-pulley flexible transmission of this kind is known from WO 2011/148474 A1, for example. The arrangement of rolling-element bearings embodied as fixed bearings in a manner fixed or braced in the axial direction has to be secured within the transmission housing in this case.

SUMMARY

Proceeding on this basis, it is the underlying object of the present disclosure to at least partially overcome the disadvantages known from the prior art. In particular, the intention is to enable the arrangement, fixed or braced in the axial direction, of a rolling-element bearing embodied as a fixed bearing within the transmission housing, wherein it is possible to simplify assembly and ensure the fixing of the fixed bearing.

The present disclosure relates to an arrangement for bracing a fixed bearing in an axial direction, at least comprising a cone-pulley flexible transmission having a transmission housing, in which at least one first shaft having a first cone-pulley pair and one second shaft having a second cone-pulley pair, each having a first cone pulley movable in an axial direction and a second cone pulley stationary in the axial direction, and a flexible transmission means arranged between the cone-pulley pairs for torque transmission, are arranged; wherein the shafts are each rotatably supported by means of rolling-element bearings; wherein at least one rolling-element bearing of a shaft is a fixed bearing and comprises an inner bearing ring, which is arranged on an outer circumferential surface of the shaft, and an outer bearing ring, wherein the outer bearing ring is fastened to the transmission housing by means of a sleeve, which extends through a wall of the transmission housing.

In a rolling-element bearing, a distinction is drawn between a fixed bearing and a floating bearing. The fixed bearing transmits forces acting in all directions. In a floating bearing, there is no connection in one or in two of the three directions in space. It is used when the intention is to maintain static determinacy in the case of multiple support for a body.

The fixed bearing on one end of the shaft serves as a radial support and, at the same time, fixes the shaft axially in both axial directions. It must therefore be fastened both to the shaft and to a housing. Suitable bearings include, in particular, radial bearings which can absorb combined loads, e.g. deep groove ball bearings, double-row or matched single-row angular contact ball bearings, self-aligning ball bearings, self-aligning roller bearings or matched taper roller bearings. Combinations of a radial bearing which can absorb only radial loads, e.g. a cylinder roller bearing having a ring without flanges, with a deep groove ball bearing, four-point bearing or an axial bearing on both sides can likewise be used as a fixed bearing (unit). The second bearing then ensures the axial preload in both directions but must be installed with radial play, i.e. a bearing clearance must be ensured in the housing.

Such fixed bearing units (the cited combinations of rolling-element bearings) are likewise referred to below as fixed bearings.

In particular, the sleeve extends in the axial direction over the outer bearing ring (of the fixed bearing/the (complete) fixed bearing unit) and surrounds the outer bearing ring in a radial direction on a first side facing away from the transmission housing. Here, "surround" means, in particular, that the sleeve extends externally over the outer bearing ring in the axial direction and then forms an overlap pointing inward in the radial direction, the outer bearing ring thus being connected positively to the sleeve (by way of the overlap) at least in one of the axial directions.

Positive connections are formed, in particular, by the interengagement of at least two connection partners (here the overlap and the outer bearing ring). As a result, the connection partners cannot become detached, even where there is no force transmission or where force transmission is interrupted. In other words, in the case of a positive connection, one connection partner is in the way of the other.

According to another embodiment, the sleeve is formed integrally with the outer bearing ring (of the fixed bearing unit), with the result that the outer bearing ring of the fixed bearing itself forms the sleeve and extends through the wall of the transmission housing.

In particular, the sleeve is cylindrical in shape, at least in a first axial region, and has wall sections which are spaced apart in a circumferential direction, wherein these wall sections extend through the wall.

In particular, the sleeve has a second axial region, which surrounds at least the extent of the outer and/or inner bearing ring in the axial direction. This second axial region is adjoined by the first axial region and extends in the axial direction through the transmission housing as far as the end of the sleeve.

In particular, the wall sections form a type of finger, and these extend through the wall through corresponding openings in the wall of the transmission housing.

In particular, a cylindrical element, e.g. a ring element, on which the wall sections are supported in a radial direction, is arranged on the outer side of the wall.

According to a preferred embodiment, a fixing element having a mating thread is arranged on an outer side of the wall, wherein the mating thread interacts with a thread which is formed on the wall sections (in particular on at least some thereof), the sleeve thus being fastened to the transmission housing by means of the fixing element.

In particular, the wall sections thus form a thread which is in each case interrupted in the circumferential direction, wherein the threads of all the wall sections interact with the (single) mating thread of the fixing element.

The fixing element preferably surrounds the wall sections on the outside in a radial direction and has an internal thread, wherein each wall section (or at least some of the wall sections) has (have) an external thread. The external threads of all the wall sections interact with the (single) internal thread of the fixing element in the manner of a nut/bolt connection. Here, therefore, the fixing element forms the nut and the wall sections together form the bolt.

In particular, the fixing element has a sealing ring, which forms a sealing surface running around in the circumferential direction with the outer side of the wall. Thus, in particular, the sealing surface surrounds, on the outside in the radial direction, the openings in the wall through which the wall sections of the sleeve extend. The transmission housing is thereby sealed off from the outside by means of the fixing element.

In particular, the transmission housing has a cylindrical flange, which extends into the transmission housing in the axial direction, wherein the outer bearing ring is supported in the axial direction on one end of the flange.

In particular, the flange is arranged within the first axial region of the sleeve in the radial direction.

A motor vehicle in which an arrangement according to the present disclosure comprising a cone-pulley flexible transmission transmits a torque of a drive unit to the wheels of the motor vehicle is furthermore proposed.

BRIEF DESCRIPTION OF THE DRAWINGS

The present disclosure and the technical background are explained in greater detail below with reference to the figures. The figures show particularly preferred illustrative embodiments, although the present disclosure is not restricted thereto. In particular, it should be noted that the figures and especially the size ratios shown are only schematic. Identical reference signs refer to identical objects. In the drawing:

FIG. 1: shows an arrangement in a side view;
FIG. 2: shows a detail of the arrangement shown in FIG. 1 in accordance with a first variant embodiment in a side view and in section.

DETAILED DESCRIPTION

Figure 3:
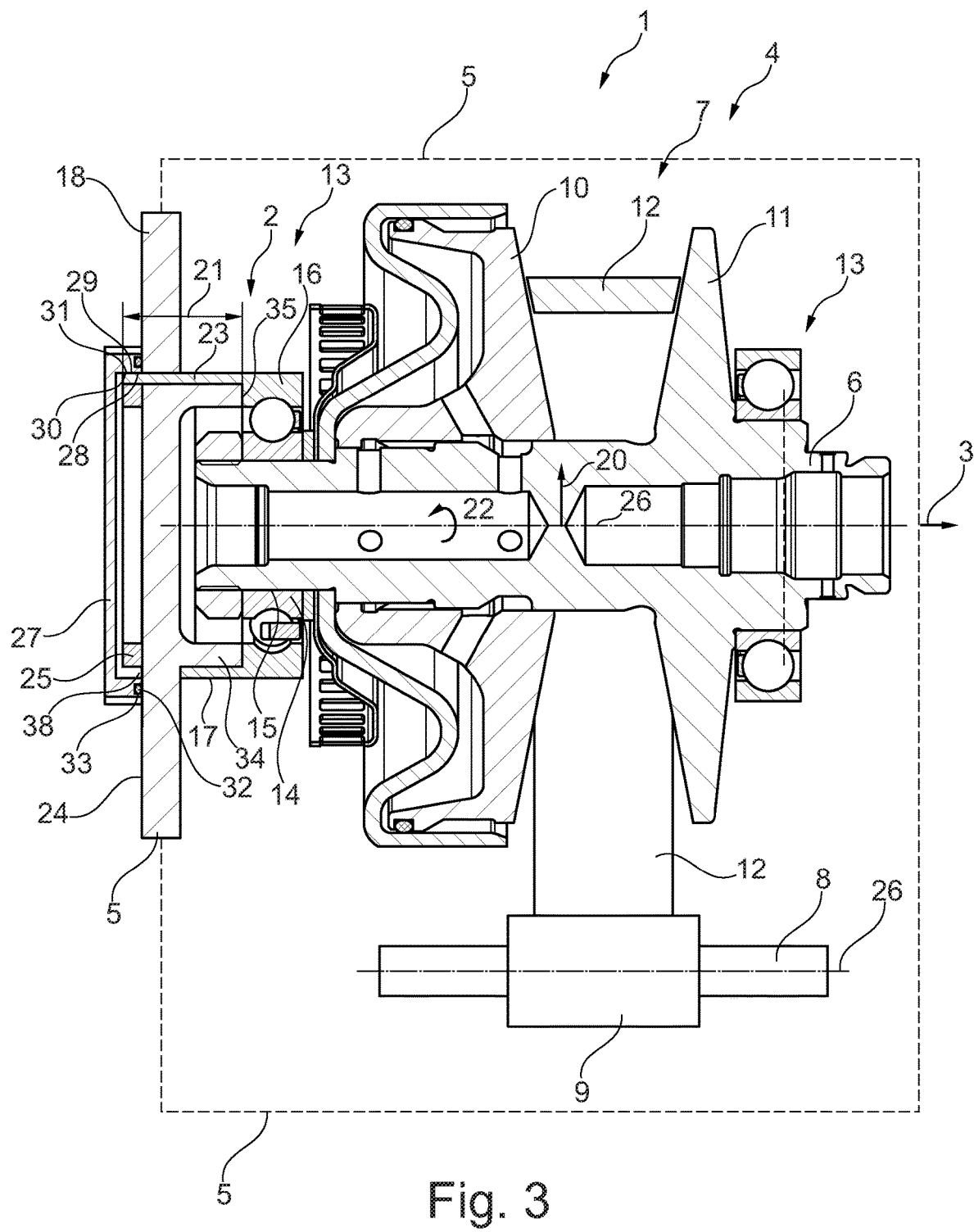
FIG. 3: shows an arrangement in accordance with a second variant embodiment in a side view and in section.

FIG. 1 shows an arrangement 1 in a side view. The arrangement 1 comprises a cone-pulley flexible transmission 4 having a transmission housing 5, in which at least one first shaft 6 having a first cone-pulley pair 7 and one second shaft 8 having a second cone-pulley pair 9, each having a first cone pulley 10 movable in an axial direction 3 and a second cone pulley 11 stationary in the axial direction 3, and a flexible transmission means 12 arranged between the cone-pulley pairs 7, 9 for torque transmission, are arranged. The shafts 6, 8 are each rotatably supported by means of rolling-element bearings 13. Here, the first shaft 6 is mounted so as to be rotatable relative to the transmission housing 5 by means of a fixed bearing 2.

A sleeve 17 covers the fixed bearing 2 and extends through a wall 18 of the transmission housing 5. In a first axial region 21, the sleeve 17 is cylindrical in shape and has wall sections 23 which are spaced apart in a circumferential direction 22, wherein these wall sections 23 extend through the wall 18. The wall sections 23 form a type of finger, and these extend through the wall 18 through corresponding openings in the wall 18 of the transmission housing 5. A fixing element 27 having a mating thread 28 is arranged on the outer side 24 of the wall 18, wherein the mating thread 28 interacts with a thread 29 which is formed on the wall sections 23, the sleeve 17 thus being fastened to the transmission housing 5 by means of the fixing element 27.

FIG. 2 shows a detail of the arrangement 1 shown in FIG. 1 in accordance with a first variant embodiment in a side view and in section. Here, the sleeve 17 extends in the axial direction 3 over the outer bearing ring 16 (of the fixed bearing 2/of the (complete) fixed bearing unit) and surrounds the outer bearing ring 16 in a radial direction 20 on a first side 19 of the fixed bearing 2 facing away from the transmission housing 5. Here, "surround" means that the (cylindrical) sleeve 17 extends externally over the outer bearing ring 16 in the axial direction 3 and then forms an overlap 36 pointing inward in the radial direction 20, the outer bearing ring 16 thus being connected positively to the sleeve 17 (by way of the overlap 36) at least in one of the axial directions 3. The sleeve 17 is cylindrical in shape in a first axial region 21, and has wall sections 23 which are spaced apart in a circumferential direction 22, wherein these wall sections 23 extend through the wall 18. Furthermore, the sleeve 17 has a second axial region 37, which surrounds at least the extent of the outer bearing ring 16 and/or inner bearing ring 14 in the axial direction 3. This second axial region 37 is adjoined by the first axial region 21 and extends in the axial direction 3 through the transmission housing 5 as far as the end of the sleeve 17, said end being arranged outside the transmission housing 5.

The wall sections 23 each form a type of finger, and these extend through the wall 18 through corresponding openings in the wall 18 of the transmission housing 5. A cylindrical element 25, here a ring element, on which the wall sections 23 are supported in a radial direction 20, is arranged on the outer side 24 of the wall 18.

A fixing element 27 having a mating thread 28 is arranged on an outer side 24 of the wall 18, wherein the mating thread 28 interacts with a thread 29 which is formed on the wall sections 23, the sleeve 17 thus being fastened to the transmission housing 5 by means of the fixing element 27. Here, the fixing element 27 surrounds the wall sections 23 on the outside in a radial direction 20 and has an internal thread 30, wherein each wall section 23 has an external thread 31. The external threads 31 of all the wall sections 23 interact with the internal thread 30 of the fixing element 27 in the manner of a nut/bolt connection. Here, therefore, the fixing element 27 forms the nut and the wall sections 23 together form the bolt.

The fixing element 27 has a sealing ring 32, which forms a sealing surface 33 running around in the circumferential direction 22 with the outer side 24 of the wall 18. The sealing surface 33 therefore surrounds, on the outside in the radial direction 20, the openings in the wall 18 through which the wall sections 23 of the sleeve 17 extend. The transmission housing 5 is thereby sealed off from the outside by means of the fixing element 27.

Furthermore, the transmission housing 5 has a cylindrical flange 34, which extends into the transmission housing 5 in the axial direction 3, wherein the outer bearing ring 16 is supported in the axial direction 3 on one end 35 of the flange 34.

Here, the flange 34 is arranged within the first axial region 21 of the sleeve 17 in the radial direction 20.

By means of the fixing element 27, the sleeve 17 and hence the outer bearing ring 16 can in this way be moved toward the wall 18 of the transmission housing 5. In this way, the outer bearing ring 16 can be arranged in a fixed manner on the flange 34 of the transmission housing 5 or on the transmission housing 5.

FIG. 3 shows an arrangement 1 according to a second variant embodiment in a side view and in section. Attention is drawn to the statements made with reference to FIGS. 1 and 2. In contrast to FIG. 2, the sleeve 17 is here embodied integrally with the outer bearing ring 16 of the fixed bearing 2 (of the fixed bearing unit), with the result that the outer bearing ring 16 of the fixed bearing 2 itself forms the sleeve 17 and extends through the wall 18 of the transmission housing 5. An overlap 36 of the sleeve 17 around the outer bearing ring 16 is therefore not required. The sleeve 17 is cylindrical in shape in a first axial region 21, and has wall sections 23 which are spaced apart in a circumferential direction 22, wherein these wall sections 23 extend through the openings 38 in the wall 18.

Figure 4:
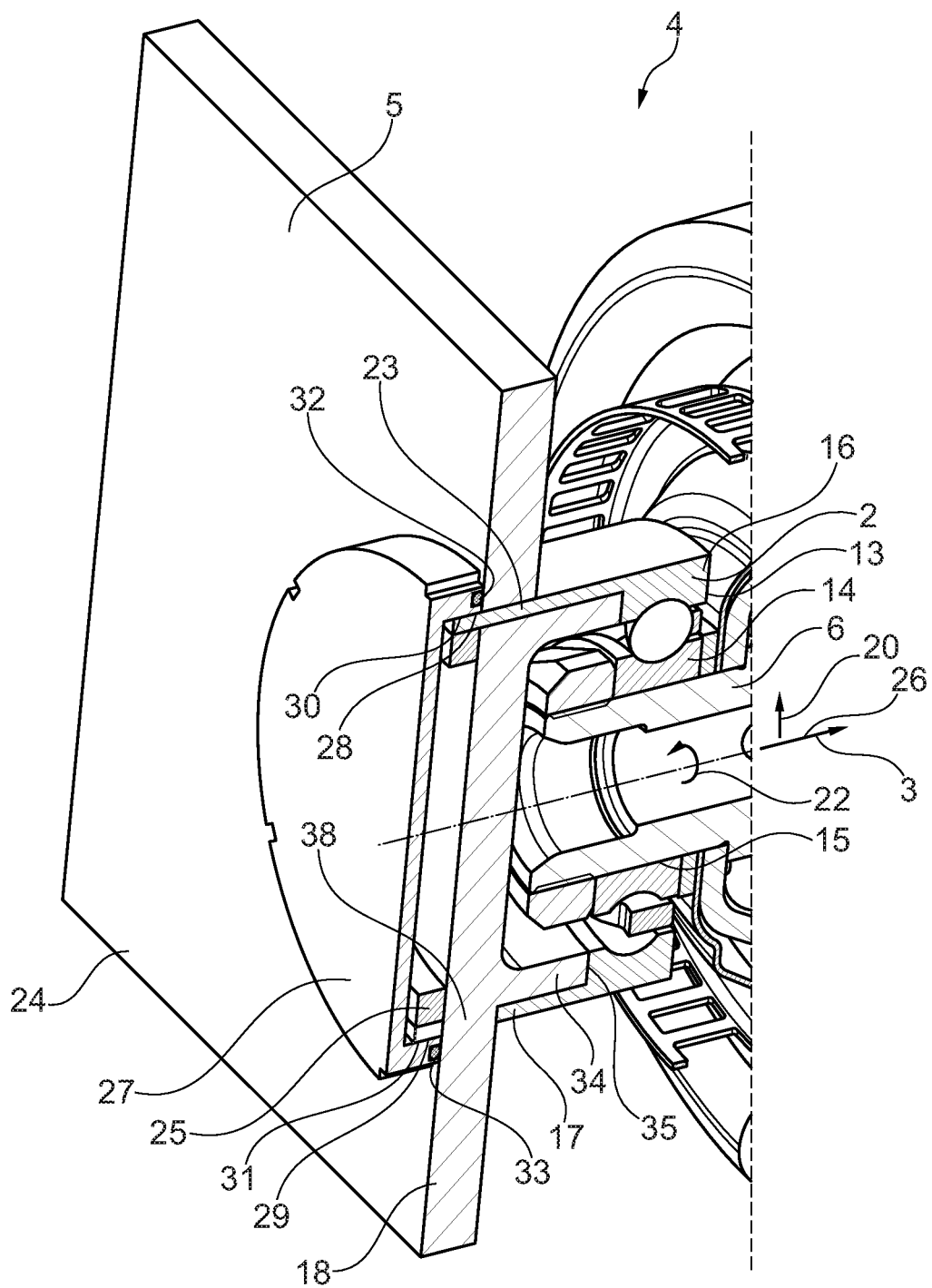
FIG. 4: shows a detail of the arrangement shown in FIG. 3 in a perspective view and in section.

FIG. 4 shows a detail of the arrangement shown in FIG. 3 in a perspective view and in section. Attention is drawn to the statements made with reference to FIGS. 1 to 3. The wall sections 23 each form a type of finger, and these extend through the wall 18 through corresponding openings 38 in the wall 18 of the transmission housing 5. A cylindrical element 25, in this case a ring element, on which the wall sections 23 are supported in a radial direction 20, is arranged on the outer side 24 of the wall 18.

The proposal is thus that a fixed bearing 2 of a cone-pulley flexible transmission 4 is fixed from outside a transmission housing 5 on the transmission housing. This method of fixing facilitates assembly and, at the same time, ensures adequately firm positioning of the fixed bearing 2.

LIST OF REFERENCE SIGNS 1 arrangement
2 fixed bearing
3 axial direction
4 cone-pulley flexible transmission
5 transmission housing
6 first shaft
7 first cone-pulley pair
8 second shaft
9 second cone-pulley pair
10 first cone pulley
11 second cone pulley
12 flexible transmission means
13 rolling-element bearing
14 inner bearing ring
15 outer circumferential surface
16 outer bearing ring
17 sleeve
18 wall
19 first side
20 radial direction
21 first axial region
22 circumferential direction
23 wall sections
24 outer side
25 element
26 axis of rotation
27 fixing element
28 mating thread
29 thread
30 internal thread
31 external thread
32 sealing ring
33 sealing surface
34 flange
35 end
36 overlap
37 second axial region
38 opening

The invention claimed is:

1. A cone-pulley flexible transmission, comprising:
a first shaft having a first cone-pulley pair;
a second shaft having a second cone-pulley pair, wherein the first and second cone-pulley pairs each have a first cone pulley movable in an axial direction and a second cone pulley stationary in the axial direction;
a flexible transmission means arranged between the first and second cone-pulley pairs for torque transmission;
wherein the first and second shafts are each rotatably supported by a bearing;
wherein the bearing of the first shaft or the second shaft is a fixed bearing and includes:
an inner bearing ring arranged on an outer circumferential surface of a corresponding shaft;
an outer bearing ring fastened to a transmission housing by a sleeve, the sleeve extending through a wall of the transmission housing;
wherein the sleeve is cylindrical in shape, at least in a first axial region, and has wall sections that are spaced apart in a circumferential direction; and
wherein the wall sections extend through a wall of the transmission housing.

2. The cone-pulley flexible transmission of claim 1, wherein the sleeve extends in the axial direction over the outer bearing ring and surrounds the outer bearing ring in a radial direction on a first side facing away from the transmission housing.

3. The cone-pulley flexible transmission of claim 1, wherein the sleeve is formed integrally with the outer bearing ring.

4. The cone-pulley flexible transmission of claim 1, further comprising a cylindrical element arranged on an outer side of the wall of the transmission housing to support the wall sections of the sleeve in a radial direction.

5. The cone-pulley flexible transmission of claim 1, further comprising:
a fixing element having a mating thread arranged on an outer side of the wall of the transmission housing;
wherein the mating thread cooperates with a thread formed on the wall sections of the sleeve; and
wherein the sleeve is fastened to the transmission housing by the fixing element.

6. The cone-pulley flexible transmission of claim 5, wherein the fixing element surrounds an outside of the wall sections in a radial direction and has an internal thread, and the wall sections have an external thread.

7. The cone-pulley flexible transmission of claim 6, wherein the fixing element has a sealing ring that forms a sealing surface running around in the circumferential direction with the outer side of the wall.

8. The cone-pulley flexible transmission of claim 1, wherein the transmission housing has a cylindrical flange extending into the transmission housing in the axial direction, wherein the outer bearing ring is supported in the axial direction on one end of the cylindrical flange.

9. A cone-pulley flexible transmission, comprising:
- a shaft having a cone-pulley pair, the cone-pulley pair including a first cone pulley movable in an axial direction and a second cone pulley stationary in the axial direction;
- a bearing rotatably supporting the shaft, the bearing including an outer bearing ring fastened to a transmission housing, wherein the bearing is fixed in the axial direction; and
- a sleeve comprising wall sections spaced apart in a circumferential direction that extend through a wall of the transmission housing to fasten the outer bearing ring to the wall of the transmission housing.

10. The cone-pulley flexible transmission of claim 9, wherein the bearing further includes an inner bearing ring arranged on an outer circumferential surface of the shaft.

11. The cone-pulley flexible transmission of claim 9, wherein the sleeve is configured to extend in the axial direction over the outer bearing ring and surround the outer bearing ring in a radial direction on a first side of the bearing.

12. The cone-pulley flexible transmission of claim 9, wherein the sleeve is fastened to the transmission housing via a fixing element arranged on an outer side of the wall of the transmission.

13. The cone-pulley flexible transmission of claim 9, further comprising a flange extending into the transmission housing in the axial direction, wherein the outer bearing ring is supported in a fixed manner in the axial direction on one end of the flange.

* * * * *